United States Patent [19]
Wang

[11] Patent Number: 5,649,999
[45] Date of Patent: Jul. 22, 1997

[54] INK ERADICATOR SYSTEM

[75] Inventor: Yichun Wang, Canton, Mass.

[73] Assignee: The Gillette Company, Boston, Mass.

[21] Appl. No.: 629,096

[22] Filed: Apr. 8, 1996

Related U.S. Application Data

[63] Continuation-in-part of Ser. No. 605,725, Feb. 22, 1996, abandoned.

[51] Int. Cl.⁶ .................... C09D 11/16; C09D 11/18
[52] U.S. Cl. .................... 106/31.32; 106/31.93
[58] Field of Search .................... 106/22 B, 22 D, 106/22 H, 32.5

[56] References Cited

U.S. PATENT DOCUMENTS

| | | | |
|---|---|---|---|
| 2,029,152 | 1/1936 | Bonkowski | 401/186 |
| 2,559,608 | 7/1951 | Ehrlich | 106/22 A |
| 3,886,083 | 5/1975 | Laxer | 106/21 A |
| 3,941,488 | 3/1976 | Maxwell | 401/17 |
| 4,139,965 | 2/1979 | Curry et al. | 434/84 |
| 4,156,657 | 5/1979 | Lin | 106/22 B |
| 4,171,982 | 10/1979 | Lin | 106/22 B |
| 4,213,717 | 7/1980 | Lin | 106/22 B |
| 4,227,930 | 10/1980 | Lin | 106/22 B |
| 4,228,028 | 10/1980 | Lin | 106/22 B |
| 4,252,845 | 2/1981 | Griffiths et al. | 106/21 A |
| 4,262,936 | 4/1981 | Miyamoto | 106/21 R |
| 4,681,471 | 7/1987 | Hayduchok et al. | 106/22 B |
| 5,006,171 | 4/1991 | Mecke et al. | 106/22 B |
| 5,059,244 | 10/1991 | King et al. | 106/22 B |
| 5,232,494 | 8/1993 | Miller | 106/22 B |
| 5,324,131 | 6/1994 | Gardner, III | 401/199 |
| 5,326,388 | 7/1994 | Miller et al. | 106/22 B |
| 5,352,282 | 10/1994 | Miller | 106/22 B |
| 5,378,752 | 1/1995 | White et al. | 524/418 |
| 5,427,278 | 6/1995 | Gardner, III | 106/22 B |
| 5,460,647 | 10/1995 | Snedeker et al. | 106/22 A |
| 5,464,470 | 11/1995 | Brachman et al. | 106/22 A |

FOREIGN PATENT DOCUMENTS

| | | |
|---|---|---|
| 32653 | 7/1981 | European Pat. Off. . |
| 32652 | 7/1981 | European Pat. Off. . |
| 2216951 | 10/1973 | Germany . |
| 2349086 | 4/1975 | Germany . |
| 2724 820 | 12/1978 | Germany . |
| 2834459 | 3/1980 | Germany . |
| 2616259 | 12/1981 | Germany . |
| 3919-588 A | 6/1988 | Germany . |
| 3919588 | 12/1989 | Germany . |
| 045 374 | 3/1982 | Japan . |
| 58-162674 | 9/1983 | Japan . |
| 004 994 | 1/1987 | Japan . |
| 63-175082 | 7/1988 | Japan . |
| 02099570 | 4/1990 | Japan . |
| 2 097 574 | 4/1990 | Japan . |

*Primary Examiner*—Helene Klemanski
*Attorney, Agent, or Firm*—Fish & Richardson P.C.

[57] ABSTRACT

An ink/eradicator fluid combination includes an ink containing a dye and a binding agent, and an eradicator fluid containing a basic nitrogen compound. The binding agent is capable of binding to the basic nitrogen compound.

25 Claims, No Drawings

INK ERADICATOR SYSTEM

This application is a continuation-in-part of U.S. Ser. No. 08/605,725, filed Feb. 22, 1996, now abandoned.

BACKGROUND OF THE INVENTION

This invention relates to ink eradicator systems.

Ink eradicator systems generally include two components. One component is an aqueous ink that includes a dye—typically a triaryl methane—that can be converted to a colorless form when contacted with a substance such as a sulfite reducing agent or a basic nitrogen compound. The second component is an aqueous eradicator fluid that includes a substance that can cause the dye to convert to a colorless form. A user writes with the ink and, if correction is necessary, applies the eradicator fluid to the ink marking to decolorize the dye.

It is desirable to be able to write-over the area to which an eradicator fluid is applied. One problem that may occur when write-over of an eradicated mark is attempted is that the new mark may fade over time as the dye in the ink comes into contact with the excess eradicating substance (e.g., sulfite or amine) in the hardened eradicator fluid.

SUMMARY OF THE INVENTION

The invention concerns the combination of an eradicatable aqueous ink and an aqueous eradicator fluid. The ink contains a dye that decolorizes if contacted with a basic nitrogen compound, such as an amine. The eradicator fluid contains the basic nitrogen compound. Importantly, the ink also includes a basic nitrogen compound binding agent that can bind the excess basic nitrogen compound in the eradicator fluid. As a result, when the ink is used to overwrite an area to which the eradicator fluid has been applied, the remaining basic nitrogen compound in the eradicator fluid becomes bound to the nitrogen compound binding agent in the ink, and accordingly does not cause significant decolorization of the dye. The ink mark made over the eradicated area thus has a reduced tendency to fade over time.

The preferred dyes are triaryl methanes. The preferred basic nitrogen compounds are non-volatile, non-toxic amines like sodium glycinate. The preferred binding agents are metal salts. Magnesium salts like magnesium sulfate and zinc salts like zinc sulfate are examples of preferred binding agents.

Preferred eradicator fluids also include a film-forming polymer. The film-forming polymer provides a thin film on the eradicated area, and as a result may decrease the write-over time. It also may slow the diffusion of the eradicator fluid to the paper, and may improve write-over quality. Preferred film-forming polymers include polyacrylic acid sodium salts.

Preferred eradicator fluids have an eradication time of less than about 3 seconds, and more preferably less than 2 seconds. Preferred eradicator fluids have a write-over time of less than about 15 seconds and more preferably less than 10 seconds.

The invention also features an eradicatible ink including a dye that decolorizes when the ink is contacted with an 8% weight in water sodium glycinate solution, and a metal salt capable of complexing with sodium glycinate.

The invention also features a method of eradicating an ink marking on a substrate. The method includes two steps. First, an ink containing a dye that decolorizes if contacted with a basic nitrogen compound, a binding agent capable of binding the basic nitrogen compound, and water is applied to the substrate to provide a marking. Second, an eradicator fluid including the basic nitrogen compound and water is applied to the marking. The basic nitrogen compound causes the dye to decolorize.

The invention also features another method of providing a marking. This method also includes two steps. First, an eradicator fluid containing a basic nitrogen compound and water is applied to a substrate to provide an eradicator fluid coating. Second, an ink containing a dye that decolorizes if contacted with the basic nitrogen compound, a binding agent capable of binding to the basic nitrogen compound, and water, is applied to the eradicator fluid coating. Preferably, the method also includes initially making a mark on the substrate, over which the eradicator fluid is applied, with the same ink.

"Eradication system", as used herein, means that an ink and an eradicator fluid combination are stored unmixed in the same general packaging. For example, the ink can be in one container and the eradicator fluid in a second container, but the two containers are included in the same package.

Other features and advantages of the invention will be apparent from the description of the preferred embodiments thereof, and from the claims.

DESCRIPTION OF THE PREFERRED EMBODIMENTS

Preferred combinations include an ink and an eradicator fluid. The ink contains a triaryl methane dye, a metal salt capable of binding to the amine used in the eradicator fluid, an organic acid, a polyacrylate film-forming polymer, and water. The eradicator fluid includes a non-volatile amine capable of decolorizing the triaryl methane dye, a film-forming polymer, and water. The ink and the eradicator fluid also may include a surfactant to adjust surface tension.

Triaryl methane dyes that are capable of decolorizing in the presence of an amine are known to those skilled in the art. Examples include Acid Blue 93 and Acid Blue 22. Enough dye should be included in the ink to provide the desired color intensity, but not so much that large quantities of eradicator fluid must be applied to a mark made with the ink to cause it to decolorize. Preferred inks include between 2% and 5%, and more preferably with between 3% and 4%, of the triaryl methane dye by weight.

The preferred metal salts are capable of binding to the amine used in the eradicator fluid. The metal salt preferably also is soluble in the ink. Examples of salts are magnesium sulfate and zinc sulfate.

The ink should include a quantity of metal salt sufficient to bind to excess amine when the ink is applied to an eradicator fluid layer made over an ink mark. But not so much metal salt should be included that excessive quantities of eradicator fluid must be applied to eradicate the ink mark being corrected. The ink mark to be corrected may include the metal salt, and enough amine must be in the eradicator fluid both to bind with the metal salt in the ink mark and to decolorize the dye. Preferred inks include between 5% and 15%, and more preferably between 8% and 12%, of the metal salt by weight.

The organic acid increases the acidity of the ink and as a result increases the color intensity of the triaryl methane dye. Examples of organic acids include citric acid, and tartaric acid. A sufficient quantity of the organic acid should be included to provide an ink including a dye of the desired intensity. Preferred inks may include between 1% and 3%, and more preferably approximately 2%, of the organic acid by weight.

The polyacrylate film-forming polymer can improve the color intensity and reduce feathering from write-over. Examples of polyacrylate film-forming polymers include Sokalan CP10s, CP12s, and PA13PN, all of which are available from BASF. Enough polyacrylate film-forming polymer should be included in the ink to provide the targeted benefit, but not so much should be included that the viscosity of the ink becomes undesirably high. Preferred inks may include between 1% and 5%, and more preferably between 2% and 4%, of the polyacrylate film-forming polymer by weight.

Enough water should be included in the ink to dissolve the components and provide the ink with the desired viscosity. Preferred inks may have a viscosity between 1 cps and 3 cps, and more preferably between 2 cps and 2.5 cps. Preferred inks may include between 75% and 85% water by weight.

The non-volatile amine in the eradicator fluid causes the triaryl methane dye to decolorize when the fluid is applied over a mark made with the ink. The amine selected, in addition to preferably being non-volatile, should be non-toxic, and preferably odorless. Examples of preferred amines include glycine (in the form of sodium glycinate), other amino acid salts and polyamines.

Enough amine is included in the eradicator fluid to decolorize the dye when applied in reasonable quantities to a mark made with the ink. But large quantities of amine may interfere with the ability of the metal salt in the ink to sufficiently prohibit fading of a corrective ink marking applied to the hardened eradicator fluid. Preferred eradicator fluids may include between 7% and 12%, and more preferably between 8% and 10%, of the amine by weight.

The film-forming polymer increases the viscosity of the eradicator fluid. It also may decrease writeover time by providing a thin film on the surface of a covering made with the eradicator fluid; the thin film increases the hardness of the surface, and may make the surface suitable to receive a mark made with ink even though the eradicator fluid has not fully dried. The film-forming polymer should be compatible with the amine used in the eradicator fluid. Preferred film-forming polymers are sodium salts of polyacrylic acids. Preferred polyacrylic acid film-forming polymers have a number average molecular weight of between 1200 and 5000.

A sufficient quantity of the film-forming polymer is included in the eradicator fluid to provide the desired film and viscosity. Too much film-forming polymer may raise the viscosity to undesirable levels. Preferred eradicator fluids may include between 15% and 25%, and more preferably approximately 20%, of the film-forming polymer by weight.

Enough water should be included in the eradicator fluid to dissolve the components and provide the fluid with the desired viscosity. Preferred eradicator fluids may have, for example, a viscosity between 5 cps and 15 cps, and more preferably between 6 cps and 7 cps.

The eradicator fluid also preferably contains a buffer to maintain the pH of the solution at, for example, between 11 and 12 (more preferably at approximately 11.7). Preferred eradicator fluids may include, for example, between 75% and 85% of the aqueous buffer solution by weight.

The surface tension of the ink and the eradicator fluid can impact the eradication and writeover performance of the eradicator system. The surface tension of the ink preferably is between 30 dynes/cm and 45 dynes/cm, and more preferably is approximately 40 dynes/cm. The surface tension of the eradicator fluid preferably is between 20 dynes/cm and 40 dynes/cm, more preferably is between 25 dynes/cm and 35 dynes/cm, and most preferably is approximately 30 dynes/cm. The surface tension of the ink and eradicator fluid may be adjusted using conventional surfactants. If the surface tension of the ink is too low, the ink may penetrate too far into a paper substrate too quickly relative to the eradicator fluid that subsequently is applied. If the surface tension of the eradicator fluid is too high it may not penetrate into the paper as far, or at least as quickly, as the previously applied ink. This could lead to either incomplete eradication or an extended eradication time.

Other conventional ingredients such as bactericides, thickeners, and colorants can be included in the ink or the eradicator fluid.

The preferred inks and eradicator fluids can be used in roller ball point pens, e.g., pens which include a tubular member for fluid communication with a reservoir (either a fiber or hollow reservoir); a socket, having a seat, at one end of the member, an interior wall surface extending from the seat; a rim disposed at the end of the interior wall surface opposite the seat; and a spherical ball that is disposed in the socket, rotatably engagable with the seat and captured by the rim. The writing instrument may also include, for example, a felt tip. The inks and eradicator fluids may also be used in fountain pens.

In one embodiment, the ink and the eradicator fluid are supplied in separate pens. If desired, several ink-containing pens may be provided, each pen containing an ink.

In another embodiment, the ink and the eradicator fluid are supplied in a single pen, containing a reservoir for each. Each reservoir may be either a hollow or fiber reservoir. The two reservoirs are surrounded by a tubular member, e.g., a polypropylene barrel. If the pen is a marker, it includes nibs at opposite ends, each nib being covered by a cap. An example of a suitable nib is the polyethylene chisel nib available from Interflo. Alternatively, if it is a roller ball point pen it includes a ball and socket structure, as described above and as is well known in the art, at each end. The ink reservoir may be large enough, for example, to include approximately three times as much fluid as the eradicator fluid reservoir.

The inks and eradicator fluids may be prepared by mixing the components.

EXAMPLE 1

An ink was prepared by mixing 4 parts Acid Blue 93 (available from Orient), 2 parts citric acid, 10 parts magnesium sulfate, 2.5 parts Sokalan CP10s (available from BASF) and 81.5 parts water.

An eradicator fluid was prepared by mixing 10 parts sodium glycinate, 20 parts polyacrylic acid sodium salt (cat. no. 42034-4, available from Aldrich), 0.2 parts surfactant (Dynol, available from Air Products) and 70 parts of an aqueous buffer solution (pH 11.7). One liter of the buffer solution included 1.4841 g of boric acid, 4.1050 g of sodium hydroxide, 1.4 ml of acetic acid, and 1.4 ml of phosphoric acid.

The ink was used to write on Ampad note paper (available, for example, from Phase One Office Products Co., cat. no. AMP-20-372). The eradicator fluid was applied over a portion of the ink mark. After the eradicator fluid had hardened sufficiently, corrective ink marking was applied. No fading or feathering of the corrective marking was observed.

EXAMPLE 2

An eradicator fluid was prepared by mixing 10% (by total weight) zinc sulfate, 2.5% Sokalan CP10s, 2% citric acid, 4% Acid Blue 93, and 81.5% water.

EXAMPLE 3

An eradicator fluid was prepared by mixing 5% (by total weight) zinc sulfate, 5% magnesium sulfate, 2.5% Sokalan CP10s, 2% citric acid, 4% Acid Blue 93, and 81.5% water.

Other embodiments are within the claims. For example, an eradicator fluid can be used in combination with two inks, one including a metal salt that binds the amine in the eradicator fluid, the other lacking the metal salt. An ink mark can be made on paper with the ink lacking the metal salt, and the eradicator fluid applied to decolorize the dye. A corrective marking then can be made with the ink including the metal salt.

What is claimed is:

1. An ink and eradicator fluid combination, comprising
   an eradicator fluid containing an amine and water, and
   an ink containing a dye that decolorizes if contacted with said amine, a binding agent capable of binding said amine, and water.
2. The combination of claim 1, wherein said eradicator fluid further includes a film-forming polymer.
3. The combination of claim 2, wherein said film-forming polymer comprises a polyacrylic acid salt.
4. The combination of claim 2, wherein said eradicator fluid contains between 8% and 10% of said amine by weight, between 15% and 25% of said film-forming polymer by weight, and between 75% and 85% water by weight.
5. The combination of claim 1, wherein said ink further includes a film-forming polymer.
6. The combination of claim 1, wherein said ink contains between 3% and 4% of said dye by weight, between 8% and 12% of said binding agent by weight, and between 75% and 85% water by weight.
7. The combination of claim 5, wherein said film-forming polymer comprises a polyacrylate.
8. The combination of claim 7 wherein the pH of said eradicator fluid is between about 11 and about 12.
9. The combination of claim 1, wherein said dye comprises a triaryl methane.
10. The combination of claim 1, wherein said ink further comprises an organic acid.
11. The combination of claim 1, wherein said binding agent comprises a metal salt.
12. The combination of claim 11, wherein said metal salt comprises a magnesium salt.
13. The combination of claim 12, wherein said magnesium salt comprises magnesium sulfate.
14. The combination of claim 11, wherein said metal salt comprises a zinc salt.
15. The combination of claim 14, wherein said zinc salt comprises zinc sulfate.
16. The combination of claim 1, wherein said amine comprises sodium glycinate.
17. The combination of claim 1, wherein said eradicator fluid has an eradication time of less than 3 seconds.
18. The combination of claim 1, wherein said eradicator fluid has a write-over time of less than 10 seconds.
19. The combination of claim 1, wherein said ink has a surface tension of between 35 dynes/cm and 40 dynes/cm, and said eradicator fluid has a surface tension of between 25 dynes/cm and 35 dynes/cm.
20. An eradicatible ink, comprising a dye that decolorizes when said ink is contacted with an 8% by weight in water sodium glycinate solution, a metal salt capable of complexing with sodium glycinate, and water.
21. The eradicatible ink of claim 20, wherein said ink further comprises a non-volatile organic acid.
22. The eradicatible ink of claim 20, wherein said metal salt comprises a salt selected from the group consisting of magnesium salts and zinc salts.
23. A method of eradicating an ink marking on a substrate, comprising
   applying to said substrate an ink comprising a dye that decolorizes if contacted with an amine, a binding agent capable of binding said amine, and water, to provide a marking on said substrate, and
   applying to said marking an eradicator fluid comprising said amine and water, said amine causing said dye to decolorize.
24. The method of claim 23, wherein said binding agent comprises a metal salt.
25. A method of providing a marking, comprising
   applying an eradicator fluid containing an amine and water to a substrate to provide an eradicator fluid coating on said substrate, and
   applying to said eradicator fluid coating an ink containing a dye that decolorizes if contacted with said amine, a binding agent capable of binding to said amine, and water.

* * * * *